(12) United States Patent
Sagemüller

(10) Patent No.: US 10,801,825 B2
(45) Date of Patent: Oct. 13, 2020

(54) ADAPTER ELEMENT FOR ASSEMBLING A ROTATIONAL APPARATUS IN THE MEASUREMENT SPACE OF A COORDINATE MEASURING MACHINE

(71) Applicant: CARL ZEISS INDUSTRIELLE MESSTECHNIK GMBH, Oberkochen (DE)

(72) Inventor: Rainer Sagemüller, Aalen (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 386 days.

(21) Appl. No.: 15/833,397

(22) Filed: Dec. 6, 2017

(65) Prior Publication Data

US 2018/0100729 A1 Apr. 12, 2018

Related U.S. Application Data

(63) Continuation of application No. PCT/EP2016/064585, filed on Jun. 23, 2016.

(30) Foreign Application Priority Data

Jun. 26, 2015 (DE) .......................... 10 2015 211 951

(51) Int. Cl.
- *G01B 5/008* (2006.01)
- *G01B 5/00* (2006.01)
- *G01B 11/00* (2006.01)

(52) U.S. Cl.
CPC ........... *G01B 5/008* (2013.01); *G01B 5/0004* (2013.01); *G01B 11/005* (2013.01)

(58) Field of Classification Search
CPC ...... G01B 5/008; G01B 21/04; G01B 21/047; G01B 5/0016; G01B 11/005; G01B 21/042; G01B 5/0002; G01B 5/0004

(Continued)

(56) References Cited

U.S. PATENT DOCUMENTS

| 4,369,581 A | 1/1983 | Lenz |
| 5,410,817 A | 5/1995 | Kish |

(Continued)

FOREIGN PATENT DOCUMENTS

| CN | 104272061 A | 1/2015 |
| DE | 29822001 U1 | 5/1999 |

(Continued)

OTHER PUBLICATIONS

English translation of International Preliminary Report on Patentability (Chapter II) for PCT/EP2016/064585; dated Dec. 28, 2017; 7 pp.

(Continued)

*Primary Examiner* — Yaritza Guadalupe-McCall

(74) *Attorney, Agent, or Firm* — Harness, Dickey & Pierce, P.L.C.

(57) ABSTRACT

An arrangement includes a rotary apparatus, a device, and an adapter element configured to assemble the rotary apparatus in a measurement space of a coordinate measuring machine. The rotary apparatus has an axis of rotation (D). The adapter element includes a first fastening portion configured to fasten the adapter element in the measurement space, a second fastening portion, and a coupling portion. The rotary apparatus is fastened to the adapter element at the second fastening portion. The device is coupled to the adapter element at the coupling portion. The coupling portion is arranged adjacently to the second fastening portion. The device is positioned on the adapter element next to the rotary apparatus.

20 Claims, 10 Drawing Sheets

(58) Field of Classification Search
USPC .......................................................... 33/503
See application file for complete search history.

(56) References Cited

U.S. PATENT DOCUMENTS

| | | | | |
|---|---|---|---|---|
| 5,832,416 | A * | 11/1998 | Anderson | G01B 21/042 |
| | | | | 702/95 |
| 7,296,979 | B2 * | 11/2007 | Raab | B25B 11/005 |
| | | | | 248/205.8 |
| 7,395,607 | B1 * | 7/2008 | Broderick | B25J 7/00 |
| | | | | 33/503 |
| 8,402,668 | B2 * | 3/2013 | Osterstock | G01B 21/047 |
| | | | | 33/503 |
| 9,683,827 | B2 * | 6/2017 | Wimmer | G01B 21/042 |
| 2003/0161737 | A1 * | 8/2003 | Raab | B25B 11/007 |
| | | | | 417/63 |
| 2011/0040523 | A1 | 2/2011 | Matsushita | |
| 2014/0130363 | A1 | 5/2014 | Hagino et al. | |
| 2014/0236520 | A1 * | 8/2014 | Engel | G01B 21/042 |
| | | | | 702/95 |
| 2014/0259715 | A1 * | 9/2014 | Engel | G01B 11/005 |
| | | | | 33/503 |
| 2014/0331510 | A1 | 11/2014 | Yamane | |
| 2015/0052768 | A1 | 2/2015 | Wimmer | |
| 2018/0100729 | A1 * | 4/2018 | Sagemuller | G01B 5/0004 |

FOREIGN PATENT DOCUMENTS

| | | |
|---|---|---|
| DE | 10159442 A1 | 7/2002 |
| DE | 202004014884 U1 | 1/2005 |
| DE | 102010038783 A1 | 2/2011 |
| DE | 102010043798 A1 | 9/2011 |
| DE | 102010037352 A1 | 3/2012 |
| DE | 102012008296 A1 | 10/2013 |
| DE | 102012207336 A1 | 11/2013 |
| EP | 1640094 B2 | 6/2007 |
| EP | 2347854 A1 | 7/2011 |
| WO | 2011/089236 A1 | 7/2011 |
| WO | WO-2013156074 A1 | 10/2013 |
| WO | 2013164344 A1 | 11/2013 |

OTHER PUBLICATIONS

International Search Report for PCT/EP2016/064585; dated Sep. 5, 2016; 3 pp.

* cited by examiner

ADAPTER ELEMENT FOR ASSEMBLING A ROTATIONAL APPARATUS IN THE MEASUREMENT SPACE OF A COORDINATE MEASURING MACHINE

CROSS-REFERENCES TO RELATED APPLICATIONS

This application is a continuation of international patent application PCT/EP2016/064585, filed on Jun. 23, 2016 designating the U.S., which international patent application has been published in German and claims priority from German patent application DE 10 2015 211 951.3, filed on Jun. 26, 2015. The entire contents of these prior applications are incorporated herein by reference.

BACKGROUND OF THE INVENTION

The present invention relates to an adapter element for assembling a rotary apparatus in the measurement space of a coordinate measuring machine, an arrangement having this adapter element, a coordinate measuring machine having the adapter element or the arrangement, and a method for determining the positional situation of an axis of rotation in a coordinate measuring machine.

Coordinate measuring machines (abbreviated CMM below) are often equipped with a rotary table. The use of a rotary table has application-specific advantages. By way of example, if the form of a workpiece is measured using a rotary table, a CMM portal can remain stationary. This results in advantages in terms of accuracy when measuring (the form) since the movement errors of the CMM are not included in the measurement. Problems with accessibility often also are a reason for the use of a rotary table, for example in the case of interior undercuts, which cannot be probed in scanning fashion using a laterally protruding probe that is fastened to a CMM portal.

Now, many customers also want to capture the diameter of a workpiece, in addition to its form. Here, the following problem arises:

The workpiece coordinates captured by e.g. a probe arise in the CMM coordinate system. The workpiece is situated on the rotary table. Since the dimensions of a workpiece must be specified in the workpiece coordinate system, the captured workpiece coordinates are transformed into the workpiece coordinate system. For the transformation, the exact position and orientation (pose) of the rotary table axis must be known in the CMM coordinate system.

Sadly, the pose of the rotary table axis is not constant in time since, for example, the zero point of the CMM drifts on account of temperature variations or inherent temperature rises. This problem is referred to as "zero point drift". In addition to many others, a further possible source of error lies in a change of the probe vector, for example likewise on account of temperature variations.

What applies, especially when determining diameters by rotary table scanning, is that each drift (in the measurement direction) effects the diameter result with twice its absolute value. It is for this reason that diameters are usually determined better by scanning using the CMM portal. As a rule, users do not have any sympathy therefor as this also increases the measurement time accordingly or the measurement problem remains unsolvable on account of accessibility problems.

There are a multiplicity of methods for determining or correcting the drifts present in a CMM. Here, all (temperature) drifts (e.g. zero point drift, change in the probe geometry or deformation of the measurement table) that occur in a CMM can be combined to form an overall drift.

By way of example, cyclically measuring a fixed point (sphere) arranged on the measurement table is prior art. However, this method is relatively inaccurate.

The suggestion described in the application DE 20 12 027 533 assumes that the zero point drift is ascertained by way of two specifically arranged artifacts, which are measured cyclically. Here, each artifact is decisive for the drift in one spatial direction.

Newly determining the rotary table axis prior to each workpiece measurement in place of measuring the drift is often recommended as well. This is undesirable for measurement time reasons and for accessibility reasons (initially, the rotary table may have to be unloaded for calibrating the rotary table axis).

In general, the known methods have the disadvantages of a long measurement time, an insufficient accuracy and a high set-up outlay or high spatial requirements on the measurement table.

In addition to the above-described problems in the context of determining dimensions (diameters) by rotary table scanning, there are further problems when using a counterholder.

Counterholders are required in the case of long narrow workpieces, e.g. steering spindles or crankshafts. If a counterholder is used, the workpiece usually is spanned between an exactly centered stationery tip on the rotary table and an opposing co-moving tip on the counterholder. Here, the co-moving tip on the counterholder must be aligned as accurately as possible over the stationary tip on the rotary table. Now, the problem is that the alignment of the counterholder tip does not remain constant over time, inter alia because the material region of the measurement table between counterholder and rotary table can drift, for example in the case of a change in temperature.

A further problem in the context of the use of a counterholder consists of a counterholder representing a relatively large interference contour. Therefore, the users often construct the counterholder and take it apart again. As described above, the counterholder must be aligned very accurately in relation to the rotary table. This requires much time outlay.

It is an object of the invention to solve one or more of the problems set forth above.

SUMMARY OF THE INVENTION

According to a basic concept of the invention, an adaptor element, for example an adapter plate, for assembling a rotary apparatus is provided with an additional coupling element which serves to couple an additional device. As a consequence, an additional device can be coupled to the adapter element and also be removed from the adapter element again. In particular, the additional device is selected from a measuring body, for example for calibration purposes, a sensor holder and/or an accessory apparatus for a rotary apparatus that is likewise fastened to the adapter element.

Using an adapter element of the invention, a rotary apparatus, which is attached to the adapter element, or by way of the adapter element, can be arranged in a measurement space of a coordinate measuring machine, for example fastened to a measurement table of a coordinate measuring machine. Using the adapter element, a rotary apparatus can be provided with an additional device for various purposes. By way of example, the positional situation of an axis of rotation of the rotary apparatus can be ascertained or monitored using one or more measuring bodies. In this case, the measuring bodies serve as a reference for ascertaining or monitoring the positional situation of the axis of rotation. Alternatively, or additionally, an apparatus for holding a workpiece on or at the rotary apparatus can be coupled to the adapter element as an accessory apparatus. By way of example, a counterholder can be coupled next to a rotary table.

According to the basic concept of the invention, both a rotary apparatus and an additional device can be fastened or coupled to the same adapter element. By way of the adapter element, a constant position and/or orientation of the rotary apparatus and additional device relative to one another is obtained. By fastening or coupling to the same adapter element, the position and/or orientation relative to one another is kept constant or largely constant. Thus, the assumption can be made, for example, that position and/or orientation of one or more measuring bodies does not change relative to an axis of rotation of a rotary apparatus or that the position and/or orientation of a counterholder does not change relative to an axis of rotation of the rotary apparatus.

The coupling means for coupling an additional device preferably is arranged on the adapter element, adjacent to a fastening point for the rotary apparatus. This means that, in the coupled state, an additional device is positioned on the adapter element adjacent to a rotary apparatus, expressed differently: next to a rotary apparatus. Preferably, a distance between the additional device and rotary apparatus is kept as small as possible. A coupling means for an additional device preferably is arranged on the same side of the adapter element as a fastening means and/or a fastening region for fastening the rotary apparatus to the adapter element. As a consequence, a rotary apparatus that is fastened to the adapter element and an additional device that is coupled to the adapter element preferably are fastened and coupled to the same side of the adapter element. This side of the adapter element is also referred to as fastening side or coupling side.

The adapter element may have a plurality of coupling means, wherein respectively one additional device can be coupled to each of the coupling means or with each one of the coupling means. The type, number and composition of the additional devices are freely selectable in arbitrary combinations, with special combinations still being discussed below.

If a plurality of coupling means are present, these are numbered for the purposes of the following description so as to be able to distinguish between them, for example, these are referred to as "first" coupling means, "second" coupling means, etc. The terms "first", "second", "third", etc. mean a numbering of objects that otherwise have the same designation in order to be able to differentiate clearly between said objects. The numbering of objects that otherwise have the same designation can be modified without departing from the scope of the invention. In an alternative phrasing, the numbering can also be omitted and replaced by a different clear reference, for example to a different disclosed object. Further, the presence of an object with a higher numbering, for example a third coupling means, does not necessarily presume that a first coupling means and a second coupling means also need to be present. By way of example, a first coupling means can be present for coupling a first measuring body, a second coupling means can be present for coupling a second measuring body, a third coupling means can be present for coupling a third measuring body and a fourth coupling means can be present for coupling an accessory apparatus for the rotary apparatus. This represents a special combination. By way of example, the third coupling means can be removed again from this combination in order to arrive at a less special combination. Nevertheless, the numbering of the coupling means from the special combination is kept in this less special combination for reasons of simplicity, and so a first coupling means, a second coupling means and a fourth coupling means are present and a third coupling means is no longer present. However, it is also possible to bring the numbering in line with the more general combination and, for example, now denote the coupling means for coupling an accessory part as third coupling means.

The invention specifies, in particular, an adapter element for assembling a rotary apparatus having an axis of rotation in the measurement space of a coordinate measuring machine, in particular on the measurement table of a coordinate measuring machine, said adapter element having
  at least one first fastening means and/or a first fastening region for fastening the adapter element in the measurement space,
  at least one second fastening means and/or a second fastening region for fastening the rotary apparatus to the adapter element,
wherein the adapter element has at least one coupling means for coupling an additional device, wherein the coupling means is arranged on the adapter element, adjacently to the second fastening means and/or the one second fastening region for the rotary apparatus.

The measurement space is a space in the CMM which is accessible for the purposes of a coordinate measurement, in particular a space in which objects can be captured by a measurement system of the CMM for the purposes of a coordinate measurement, in particular in a tactile or optical manner.

In particular, a coupling means is embodied to interact with one or more further coupling means to establish a coupling. In particular, a coupling means is a connection means and serves to establish a connection, such as a connection to an aforementioned additional device. The connection can be interlocking and/or force-fit.

The coupling means can be of such an embodiment or nature that coupling of the additional device in a reproducible position and/or orientation is facilitated. In this embodiment, an additional device can be decoupled and coupled back on with the same position and/or orientation.

The adapter element according to the invention can have an integral or multi-part embodiment. In particular, the adapter element can have a first part, on which a fastening means or fastening region for fastening a rotary apparatus is provided, and a second part, on which a coupling means for coupling an additional device is provided. Further parts (third part, fourth part, etc.) can be provided, said further parts each having a coupling means for coupling a further additional device (second additional device, third additional device, etc.). As a consequence, a first part of an adapter element, which may be referred to as a base part, can be extended by coupling options for coupling one or more additional devices. Preferably, an interface is provided between a first part of an adapter element and a second part of an adapter element. The interface may facilitate a reproducible coupling together of the parts such that a certain position and/or orientation, preferably a certain position, of the two parts relative to one another can be established in a reproducible manner. Coupling means can be provided in each case on the first part and the second part of an adapter element. Such coupling means can be embodied to establish reproducible coupling of the parts. This may apply analogously to a third part, a fourth part, etc. of an adapter element.

An adapter element can have, in particular, a planar or elbow-shaped embodiment, in the form of an adapter plate or an adapter bracket.

In particular, the rotary apparatus is a rotary table, for example, a single axis, two axis or n axis (n=integer) rotary table, a rotary joint with an axis of rotation or a rotary swivel joint with two or more axes of rotation. In particular, a rotary apparatus comprises a rotor and a stator. Preferably, a stator is fastened to an adapter element according to the invention and a rotor is rotatable relative to the adapter element. In the case of a rotary table, the rotor can be embodied as a rotary plate. In another variant, a rotor can be coupled to a rotary plate or a plane disk in the case of a rotary table. A workpiece can be positioned on a rotary plate or a plane disk.

Within the meaning of this invention, the axis of rotation of the rotary apparatus should be understood to be a virtual axis of rotation. Expressed differently, the axis of rotation is a non-physical rotational shaft, about which parts of the rotary apparatus, in particular a rotor and a stator, are rotatable relative to one another.

In particular, an additional device is a calibration device, a measuring device or a measurement auxiliary device, or an apparatus for holding a workpiece.

In particular, the additional device can be selected from a measuring body, a sensor holder and/or an accessory apparatus for the rotary apparatus.

The coupling means for coupling an additional device can interact with a further coupling means provided on the additional device. The coupling means on the adapter element and on the additional device can be embodied engaging in one another in such a way that a unique relative position and/or orientation of the additional device is establishable relative to the adapter element. By way of example, if the coupling means on the adapter element and additional device engage in one another in order to establish coupling between the additional device and adapter element, a movement of the additional device relative to the adapter element can be prevented, in particular an autonomous movement without intervention by the user. Optionally, the connection between additional device and adapter element may be secured by one or more further connection means in order to prevent the additional device from detaching from the adapter element.

The coupling means can be formed on, or attached to, the adapter element. A coupling means can have an integral embodiment or can be embodied from a plurality of parts. A plurality of parts of a coupling means can be attached individually to the adapter element. An analogous statement applies to a coupling means that is provided on an additional device.

In particular, interacting coupling means, i.e., for example, a coupling means on the adapter element and a coupling means on an additional device, have form features in each case, wherein the form features of the two coupling means are complementary to one another.

Two interacting coupling means or coupling means that are provided for interaction can be embodied to form an interlocking and/or force-fit connection.

For establishing a coupling between the adapter element and the additional device, a coupling means of an adapter element and a coupling means of an additional device can interact with one or more further coupling means, which may be a further separate part or further separate parts. By way of example, the adapter element and additional device may each have a hole as a coupling means and a screw can be added as a further coupling means, said screw being guided through one of the holes and being screwed into a female thread in the other one of the holes.

Special configurations of coupling means are specified below in an exemplary manner.

In an embodiment, the coupling means on the adapter element and a coupling element interacting therewith are embodied on an additional device for a plug-in connection or form a plug-in connection. By way of example, an additional device can have a shaft which forms a coupling means of the additional device and the adapter element can have a depression into which the shaft can be inserted. The principle can also be exactly inverted.

In one embodiment, a coupling means on the adapter element and a coupling means on an additional device form a three-point bearing. The following examples can be given in this respect:

As a coupling means, the adapter element has three cylinders, preferably made of hard metal, in particular with a 120° subdivision. The additional device has three pairs of spheres. The cylinders can engage into the pairs of spheres. Naturally, the arrangement can be reversed, i.e. the cylinders can be on the additional device and the pairs of spheres can be on the adapter element.

The adapter element can have three spheres as a coupling element, preferably with a 120° subdivision, and the additional device can have three depressions as coupling means, into which the spheres engage. A reverse arrangement is possible. The spheres can engage in pairs of cylinders or sphere triplets instead of in depressions.

This exemplary listing of three-point bearings is not exhaustive and should only elucidate the principle in a non-restrictive manner.

A coupling means on the adapter element can have at least one elevation (also referred to as projection) and/or at least one depression. A coupling means on the additional device can have at least one elevation and/or at least one depression. The terms elevation and depression can be relative to one another. Elevations and/or depressions on the adapter element and on the additional device preferably are formed in a complementary manner to one another. A cap and a counter cap, which preferably are formed in a manner complementary to one another, are an example of this. Further examples are plug-in connection elements, wherein one plug-in connection element is provided on the adapter element and a complementary plug-in connection element is provided on the additional device. A further example of coupling means that have an operative connection to one another are a screw and a depression with a female thread.

The aforementioned first fastening means for fastening the adapter element in the measurement space, in particular on a measurement table, can be attached to, or formed on, the adapter element. An aforementioned second fastening means for fastening the rotary apparatus to the adapter element can be attached to, or formed on, the adapter element. These fastening means can interact with further fastening means to establish fastening.

There are no restrictions on the first fastening means. The first fastening means can interact with further fastening means for fastening the adapter element in the measurement space. Exemplary first fastening means are a plurality of holes which preferably are congruent in terms of their arrangement to a hole pattern in a measurement table. Threaded sleeves are preferably arranged in holes of a hole pattern on the measurement table. As a consequence, the adapter element can be screwed onto the measurement table using a screw which passes through a hole in the adapter element, the screw being screwed into the aforementioned threaded sleeve. In this example, the hole in the adapter element is the aforementioned first fastening means and the screw and the threaded sleeve are further fastening means.

There are no restrictions on the second fastening means. Holes that can serve to establish a screw-in connection are mentioned in an exemplary manner. The second fastening means can interact together with further fastening means for establishing a connection between the rotary apparatus and adapter element.

A first fastening region is, in particular, a constructional region on the adapter element that is suitable or embodied for establishing a fastening. By way of example, a first fastening region can form a fixation point or point of attack for a further fastening means. By way of example, the first fastening region can be an edge region of the adapter element, onto which a clamp or clamping claw, as known from WO 2013/156074, can be affixed. An analogous disclosure can apply to a second fastening region for fastening the rotary apparatus.

The adapter element preferably has an upper side and a lower side. The lower side is the side with which the adapter element can be fastened in a measurement space, in particular can be fastened to a measurement table. The upper side is the side on which a rotary apparatus is arrangeable. Preferably, a second fastening means and/or a second fastening region is arranged on the aforementioned upper side. Furthermore, an aforementioned coupling means for coupling an additional device preferably is arranged on the aforementioned upper side.

The adapter element can be fastened in a measuring space of the CMM in very different ways. The fastening on a measurement table has already been mentioned. Further components which are arrangeable within or outside of the measurement space and by means of which the adapter element can be fastened in the measurement space are usable. By way of example, a further component can be fastened to a measurement table or a further part of the CMM. By way of example, the adapter element can be fastened to a frame which surrounds the measurement table.

A measuring body can be a measuring body that can be captured by tactile means or a measuring body that can be captured by optical means. A measuring body that can be captured by tactile means is also referred to as a probe body. In particular, a measuring body has a measuring body reference point which is establishable, or the coordinates of which are establishable by measuring the measuring body. The positional situation or change in positional situation of another object, another spatial point or a spatial axis, in particular an axis of rotation, can be ascertained relative to the measuring body reference point.

A probe body is a body that can be probed using a measurement system of a coordinate measuring machine that measures by tactile means. A tactile measurement system is known per se. In particular, a tactile measurement system has a probe. The probe can have a probing element, for example a probing sphere or a differently shaped probing element. Probing is carried out, in particular, by means of the probe, more particularly by means of a probing element of the probe, as known in general from tactile CMMs.

In particular, a probe body has a reference point that is determinable by probing and also referred to as probe body reference point. With the aid of one or more probe body reference points, it is possible to ascertain at least one coordinate or the positional situation or a change in the positional situation of the axis of rotation relative to one or more reference points by way of probing one or more probe bodies. One or more coordinates of a probe body reference point may be known. In particular, a probe body reference point can be positioned on a straight line that is parallel to a coordinate axis (CMM main axis) and extends through an axis of rotation and the reference point.

The type of probe body is not particularly restricted for as long as a reference point that does not change over time and relative to the body can be defined on or in the probe body, said reference point being able to be captured or ascertained in a reproducible manner by the measurement system of the CMM. In particular, and without loss of generality, a probe body is selected from a ring, a disk, a cylinder, a hollow cylinder, a sphere, a gauge block, an internal taper, a sphere triplet for self-centered probing or a combination thereof. An example of a ring is an annulus which has a very small deviation from roundness but may have any diameter. In the case of a ring, a disk, a cylinder, a hollow cylinder or a sphere, probing can be carried out at a plurality of points using the measurement system of the CMM and the center of the ring, of the disk, of the cylinder or of the sphere can be determined therefrom. When probing by way of scanning, a relatively high measurement speed is obtained when ascertaining a reference point, for example the center of the ring or sphere. In the case of a rotationally symmetric probe body, a circular scan can be carried out, preferably at a constant Z-level. Scanning means the continuous, uninterrupted probing of a contour with a continuous (dynamic) adoption of measurement values, as a result of which a density point sequence arises.

For the purposes of coupling to the adapter element, a measuring body can have a base, a shaft or a connection piece, by means of which the measuring body can be coupled. Further, the measuring body can have aforementioned coupling means which, for example, are attached or formed on a shaft, a base or a connection piece.

The form and configuration of a measuring body can be known or ascertained, for example with a measurement system of the CMM, said measuring body currently being used. By way of example, use can be made of measuring bodies with shafts of different heights. The length thereof can be known in advance or can be identifiable. Alternatively, measuring bodies with different forms can be used, like different geometric forms in the case of probe bodies. The form may be known in advance or ascertained.

An accessory apparatus for the rotary apparatus is preferably an apparatus for holding a workpiece. A workpiece that is positioned on the rotary apparatus, in particular on a rotor of the rotary apparatus, can be held on the rotary apparatus with the aid of an apparatus for holding a workpiece. Examples of such apparatuses are a counterholder mentioned at the outset or a center support. Using the adapter element according to the invention, it is possible to couple an apparatus for holding a workpiece to the adapter element. In particular, coupling can be effectuated in a reproducible manner, wherein, in particular, the apparatus can be arranged in a reproducible manner in terms of its position and/or orientation relative to a rotary apparatus that is coupled to the adapter element. In particular, it is possible to position a co-moving tip of a counterholder, which was discussed at the outset, on the axis of rotation.

Using the adapter element according to the invention, it is possible to attach a measuring body next to a rotary apparatus that is fastened to the adapter element. In particular, it is possible to attach, with a reproducible position and/or orientation, a measuring body relative to a rotary apparatus fastened to the adapter element and hence it is possible to arrange or position a measuring body reference point in a correspondingly reproducible manner. The following advantages emerge for a user, which will also become clear on the basis of a method according to the invention that is described below:

The position of one or more measuring bodies can be known in advance. As a result, the manual calibration of measuring bodies by the user is dispensed with. The system finds the measuring bodies automatically or a calibration is only required once. The results obtained from the calibration can be stored in a controller of a coordinate measuring machine. As a result, a fixed relationship between measuring body or measuring body reference point and axis of rotation can be stored, and so the position of the measuring body or of its reference point also is known in advance if the position and/or orientation of the rotary apparatus or of the axis of rotation is known. As a rule, the position and orientation of the axis of rotation is ascertained since the highest accuracy is often required here. Then, the positional situation of the measuring bodies can be deduced from the axis of rotation pose. This is of particular interest if the positional situation relations are stored in the controller in any way. However, only the position of the rotary table axis, and not the orientation thereof, is required in some rotary tables. That is why it is also possible to deduce the positional situation of the axis of rotation from the measuring body reference point.

The set-up outlay for the user drops as a result of the fixedly predetermined coupling to the adapter element by means of a described coupling means.

As a result of the fixedly predetermined coupling to a coupling means, the location of the measuring body reference point can be fixed and ascertained, in particular also reproduced, relative to the axis of rotation, in particular also the coordinates thereof, in a coordinate system, for example a machine coordinate system of a CMM. A relative relation between the measuring body reference point and axis of rotation can be ascertained, for example within the scope of a first calibration. Then, a temporal change in this relation (drift) can be obtained by one or more subsequent renewed ascertainments of the relationship by way of a so-called repetition measurement.

Combinations of a plurality of coupling means and of a plurality of additional devices are discussed below.

In one embodiment, the adapter element has a first coupling means for coupling a first measuring body and a second coupling means for coupling a second measuring body. As a result of the option of coupling two measuring bodies, it is possible to effectuate an even simpler and more accurate determination of the positional situation of the axis of rotation. In particular, two coordinates of an axis of rotation can be ascertained in a machine coordinate system of a CMM. The first coupling means and the second coupling means on the adapter element can be arranged, and the coupleable first and second measuring bodies can be embodied, in such a way that a first measuring body reference point (of the first measuring body) and a second measuring body reference point (of the second measuring body) are positionable on two different coordinates of an axis of rotation, such as e.g. an X-coordinate and a Y-coordinate of an axis of rotation.

In particular, the adapter element is of the following nature: if a rotary apparatus with an axis of rotation is fastened to the adapter element and if a first measuring body and a second measuring body are coupled to the adapter element, a first virtual line, which extends from the axis of rotation of a rotary apparatus fastened to the adapter element to a measuring body reference point of the first measuring body and which is perpendicular to the axis of rotation, and a second virtual line, which extends from the axis of rotation to a measuring body reference point of the second measuring body and which is perpendicular to the axis of rotation, include an angle of 90° or of substantially 90°. This will still be discussed on the basis of an arrangement according to the invention.

In an embodiment of the invention, the adapter element still has a third coupling means for coupling a third measuring body, in addition to the aforementioned first coupling means for coupling a first measuring body and the aforementioned second coupling means for coupling a second measuring body. As a result, the following advantage is obtained: a third measuring body reference point which, together with a first measuring body reference point of the first measuring body and a second measuring body reference point of the second measuring body defines a plane, can be determined on the basis of a coupled third measuring body. By repeated ascertainment of the positional situation in such a plane, for example in a machine coordinate system of a CMM, it is possible to ascertain a change in the positional situation of the plane and, from this, a tilt of the adapter element, of a rotary apparatus attached thereto or of an axis of rotation, for example in a machine coordinate system of a CMM.

In an embodiment of the invention, the adapter element has a fourth coupling means for coupling an accessory apparatus for the rotary apparatus, in particular an apparatus for holding a workpiece, specifically a counterholder or a center support. The advantages of such coupling, preferably reproducible coupling, of such an accessory apparatus, in particular of a counterholder with a co-moving tip, were explained above.

In an embodiment, the adapter element consists of a temperature-invariant material or has one or more regions made of a temperature-invariant material. The term temperature-invariant means that the coefficient of thermal expansion of the material is less than or equal to $2.0 \cdot 10^{-6}$ $K^{-1}$ in a temperature range from 20° C. to 90° C. An exemplary material of this type is an iron-nickel alloy made of 64% iron and 36% nickel, which is also known by the trademark "Invar". A further example of a temperature-invariant material is a glass ceramic with an extremely low thermal expansion which, for example, is distributed under the trademark Zerodur®.

A temperature-invariant material brings about a particularly high consistency of the relative position and/or orientation of an additional device relative to the axis of rotation of a rotary apparatus fastened to the adapter plate. Thus, e.g. the position and/or orientation of a measuring body relative to the axis of rotation remains particularly constant.

In a special variant, a region made of temperature-invariant material extends from the location of the adapter element at which the coupling means is formed or attached to the location of the adapter element at which the axis of rotation of a rotary apparatus fastened to the adapter element impinges on the adapter element. In particular, the last-mentioned location is a location of the center of a rotary table.

If the adapter element has regions made of a temperature-invariant material then such material regions can be embodied as insert parts. Such insert parts may have a defined fastening point for fastening to further parts of the adapter element.

In the case of a multi-part adapter element, which has already been mentioned above, a first part of the adapter element can be made of a temperature-invariant material and a second part, on which the coupling means for an additional device is provided, can be made of a temperature-invariant material. The advantage obtained hereby is that the second part can be fastened to any point on the first part and the relative position of the fastening means or fastening region for a rotary apparatus on the first part and the coupling means for the additional device on the second part is thermally invariant. In the case of fastening as desired, the position and/or orientation of the additional device relative to an axis of rotation of a rotary apparatus fastened to the adapter element can be ascertained once.

In an embodiment, the adapter element has a coupling means for coupling the rotary apparatus to the adapter element, preferably for coupling in a reproducible position and/or orientation, for the purposes of which the coupling means can be configured accordingly. To this end, reference is made to the meaning, purpose, type and nature of a coupling means, which were already explained above on the basis of a coupling means for an additional device. An analogous disclosure may also apply to a coupling means for a rotary apparatus. A coupling means may be embodied at the rotary apparatus, said coupling means interacting with the coupling means on the adapter element, in particular interacting in such a way that a reproducible position and/or orientation of rotary apparatus in relation to the adapter element is establishable.

The adapter element can be embodied in such a way that the axis of rotation of a rotary apparatus fastened to the adapter element is aligned parallel to a measurement table surface when the adapter element is also fastened to the measurement table. An example of this is an angular, in particular right-angled embodiment of an adapter element. The adapter element can be fastened to the measurement table with one limb and the rotary apparatus can be fastened to the second, angled limb. Preferably, a coupling means for coupling an additional device likewise is provided on the angled limb.

The adapter element can have one or more temperature sensors. Using such a sensor renders it possible to ascertain a temperature of the adapter element and a thermal expansion can be ascertained therefrom, for example if the coefficient of expansion of the selected material of the adapter element is known. It is possible to take into account a change in form of the adapter element on account of thermal influences during measurements, in particular to correct this by calculation.

The invention furthermore discloses an arrangement having
an adapter element as described above,
at least one additional device, which preferably is selected from a measuring body, a sensor holder or an accessory apparatus for a rotary apparatus, wherein the additional device is coupled to the adapter element.

In this respect, reference is made to the disclosure above in respect of an adapter element and an additional device and in respect of the coupling of such an additional device. In a variant, the above-described arrangement also has a rotary apparatus that is fastened to the adapter element, preferably coupled with coupling means.

The invention also specifies an arrangement having
an adapter element as described above,
a first measuring body,
a second measuring body, wherein
a first virtual line, which extends from the axis of rotation of a rotary apparatus fastened to the adapter element to a measuring body reference point of the first measuring body and which is perpendicular to the axis of rotation, and a second virtual line, which extends from the axis of rotation to a measuring body reference point of the second measuring body and which is perpendicular to the axis of rotation, include an angle of 90° or of substantially 90°. Substantially 90° means, in particular, a deviation of up to 5°, preferably up to 2°, i.e. 90°±5°, preferably 90°±2°. The first measuring body and the second measuring body are arranged in respect of the axis of rotation in such a way that the aforementioned first virtual line and second virtual line include the aforementioned angle. The virtual lines are not a physical feature but imaginary lines, with the aid of which a spatial relationship of elements is set relative to one another or an arrangement of elements is set relative to one another.

In this arrangement, measuring body reference points can be positioned very well on two different coordinates of a Cartesian coordinate system. Such an arrangement is suitable, in particular, for a method for determining the position of an axis of rotation, as described in WO 2013/164344 A1.

In the arrangements according to the invention, the additional devices can be provided with an identification means in each case. By way of this identification means, the additional device can be identifiable by a controller of a coordinate measuring machine. In particular, it is possible to distinguish between different additional devices, in particular additional devices with varying geometries. Furthermore, it is possible to determine, automatically, whether or not an additional device is present. ID chips are exemplary identification means. An identification means can be configured for contactless interchange of data by radio, with an RFID tag being mentioned as an example.

The arrangement, in particular an adapter element or an additional device, can have a memory in which data, for example calibration data, relating to the relevant additional device are stored. Memory chips are exemplary memory devices. A memory device can be embodied in a structural unit with an aforementioned identification means, for example in a chip. Storing data, in particular calibration data, is advantageous in the case of counterholders in particular, since counterholders have noticeable differences between specimens on account of their usually large dimensions. In particular, a spatial relationship between a coupling means for the counterholder on the adapter element and one or more coordinates, in particular two coordinates, of a counterholder tip may be stored in an aforementioned memory, wherein this spatial relationship expresses the positional situation of the tip relative to the coupling means and/or further elements of the adapter element when the counterholder is coupled to the adapter element. The spatial relationship can be ambiguous or lacking in a third coordinate, e.g. Z, if the tip is movable along this coordinate.

In a further aspect, the invention relates to a coordinate measuring machine having an adapter element as disclosed above or an arrangement as disclosed above. An adapter element is fastened in a measurement space, in particular on a measurement table of the coordinate measuring machine. An arrangement is fastened, in particular with an adapter element, in a measurement space, in particular on the measurement table.

The coordinate measuring machine can be a tactile coordinate measuring machine having a tactile measurement system that was already explained above. The coordinate measuring machine can be an optical coordinate measuring machine, i.e. a coordinate measuring machine with an optical measurement system. In particular, the coordinate measuring machine is a portal coordinate measuring machine or a horizontal arm coordinate measuring machine. A measurement table is manufactured from e.g. granite, glass or metal and preferably has fastening points, such as threaded bores, distributed in a grid-like manner, which are also referred to as a hole pattern. An adapter element according to the invention can be fastened to such fastening points.

In a further aspect, the invention relates to a method for determining the positional situation of an axis of rotation in the machine coordinate system of a coordinate measuring machine, wherein an arrangement is provided in a coordinate measuring machine, said arrangement having an adapter element which is fastened in the measurement space of the coordinate measuring machine, a rotary apparatus, which is fastened to the adapter element, a first measuring body that has a first measuring body reference point which is positioned in a stationary manner relative to the axis of rotation of the rotary apparatus and that is coupled to the adapter element, and the method comprises the following steps:

a) ascertaining at least one coordinate of the first measuring body reference point using a measurement system of the coordinate measuring machine.

b) ascertaining at least one coordinate of the axis of rotation (D). In particular, the coordinate can be ascertained in a machine coordinate system of the CMM. In so doing, a relative position and/or orientation of the axis of rotation and first measuring body reference point is obtained.

c) repeating step a) at at least one subsequent instant and ascertaining the at least one coordinate of the axis of rotation at the subsequent instant from the at least one coordinate of the first measuring body reference point.

The aforementioned physical features of the method were already explained previously in this description. Reference is made to this and to all further physical features of this invention. All physical features of this invention can be used in the method, either individually or in combination.

Using the method according to the invention, it is possible to determine a temporal drift in the position of the axis of rotation and preferably to correct this where desired.

The measurement system of the coordinate measuring machine used in the method can be a tactile measurement system, in particular, or an optical measurement system.

The positional situation of the axis of rotation, or a change in the positional situation of the axis of rotation, can be ascertained by repeatedly determining the at least one coordinate of the first measuring body reference point. Using the method, it is possible to determine a temporal drift in the position of an axis of rotation and preferably to correct this where desired. By way of the method according to the invention, an accurate and quick method for determining the spatial positional situation of an axis of rotation is provided, said method being universally employable for all CMMs with a rotary table. The calibration of the axis of rotation can be effectuated once, for example on the basis of test bodies that are attached to the rotary apparatus. Subsequent determinations of the positional situation of the axis of rotation can be effectuated in a simplified manner on the basis of one or more measuring bodies, which are preferably positioned next to the rotary apparatus on the adapter element. The measuring bodies can be positioned so far away from the rotary apparatus that a subsequent determination of the positional situation of the axis of rotation is possible, even if an object is placed onto the rotary apparatus, for example if a workpiece is placed onto a rotary table.

Using the method according to the invention, it is possible to supply standard processes for determining the positional situation of an axis of rotation, wherein only one position of a measuring body need be determined in the coordinate system of the CMM in each case. The user need not provide any further inputs. Since the measuring body is respectively arranged in a stationary manner in relation to the axis of rotation in at least one coordinate, less inaccuracy arises when correcting the drift. By way of example, a drift is a zero point drift mentioned at the outset, a change in a probe geometry of the CMM and/or a deformation of the measurement table.

By probing a measuring body, it is possible to very quickly determine a positional situation of an axis of rotation.

In the method according to the invention, an inaccuracy on account of CAA (computer aided accuracy) residual errors is precluded since these residual errors are identical during the first time ascertainment of the position of a measuring body reference point and during a subsequent renewed determination of this position.

Constant conditions can be ensured very easily in the method according to the invention since no changes have to be undertaken on the rotary table or on the CMM to determine the positional situation of the axis of rotation at one or more subsequent instants. By way of example, it is not necessary to remove a workpiece from a rotary table for a renewed calibration of an axis of rotation. Consequently, the method facilitates the determination of the positional situation of the axis of rotation in a simple manner during the running measurement operation.

In a variant of the method, the first measuring body reference point is positioned on the X-coordinate or near the X-coordinate of the axis of rotation. As a result, the X-coordinate of the axis of rotation can be determined in a simple manner.

In a further variant of the method, the arrangement used in the method comprises:

a second measuring body that has a second measuring body reference point which is positioned in a stationary manner relative to the axis of rotation of the rotary apparatus and that is coupled to the adapter element, and the method comprises the following steps:

d) ascertaining at least one coordinate of the second measuring body reference point using a measurement system of the coordinate measuring machine, e) repeating step d) at at least one subsequent instant and ascertaining the at least one further coordinate of the axis of rotation at the subsequent instant from the at least one coordinate of the second measuring body reference point.

In particular, the second measuring body reference point is positioned on the Y-coordinate or near the Y-coordinate of the axis of rotation. In this variant of the method, it is possible to establish both the X-coordinate and the Y-coordinate of the axis of rotation in a simple manner. The term "near the X-/Y-coordinate of the axis of rotation" means a distance of the measuring body reference point from the respective coordinate of the axis of rotation of up to at most 30 mm, preferably up to at most 20 mm, most preferably up to at most 10 mm. Further preferred distances are up to at most 3 mm, preferably up to at most 2 mm, most preferably up to at most 1 mm.

In the case of two measuring bodies, the method according to the invention can be carried out in an analogous fashion to the way in WO 2013/164344 A1. Therefore, reference is made to the entire content of this document.

BRIEF DESCRIPTION OF THE DRAWINGS

The method is described below on the basis of exemplary embodiments. In the figures.

DETAILED DESCRIPTION OF THE PREFERRED EMBODIMENTS

Figure 1:
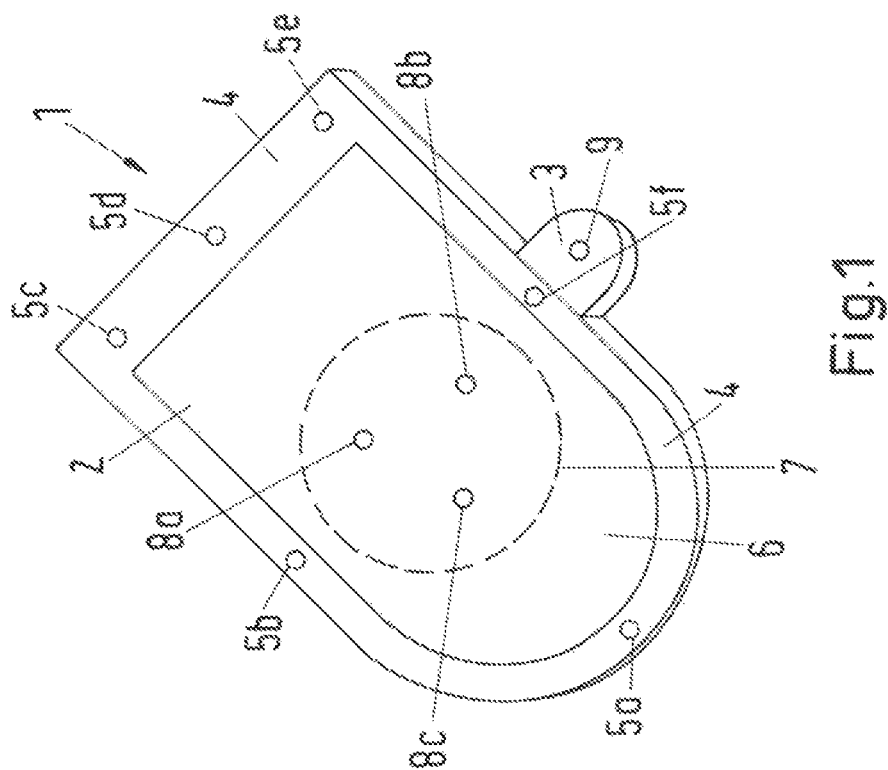
FIG. 1 shows a first embodiment of an adapter element.

Referring to the drawings, the adapter element 1 consists of a base plate 2, on which a lateral protrusion 3 has been formed. Formed in the edge region 4 are through holes 5a, 5b, 5c, 5d, 5e, 5f which are fastening means for fastening the adapter element 1 to a measurement table 201 (see FIG. 7) of a CMM. Screws that can be screwed into corresponding threaded sleeves (not shown) in the measurement table 201 can be guided through the holes 5a-5f. The edge region 4 can be used as a fastening region in addition or as an alternative to the fastening means 5a-5f. The edge region 4 has a less thick embodiment than an inner region 6. Clamps or clamping claws can be attached to the edge region 4, said clamps or clamping claws in turn being able to be connected to the measurement table 201 such that the adapter element 1 is fastened to the measurement table 201 by clamping.

Figure 3:
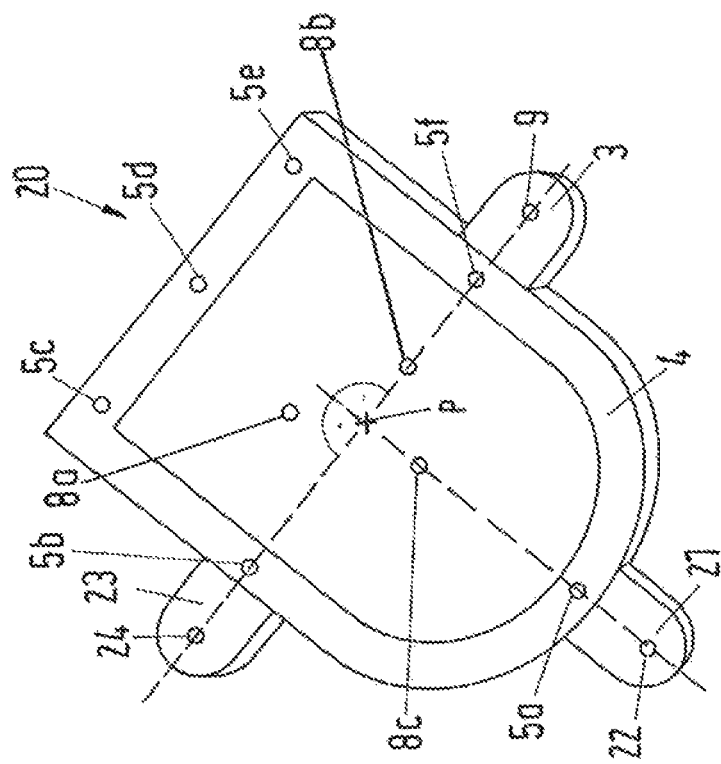
FIG. 3 shows a second embodiment of an adapter element.
Figure 4:
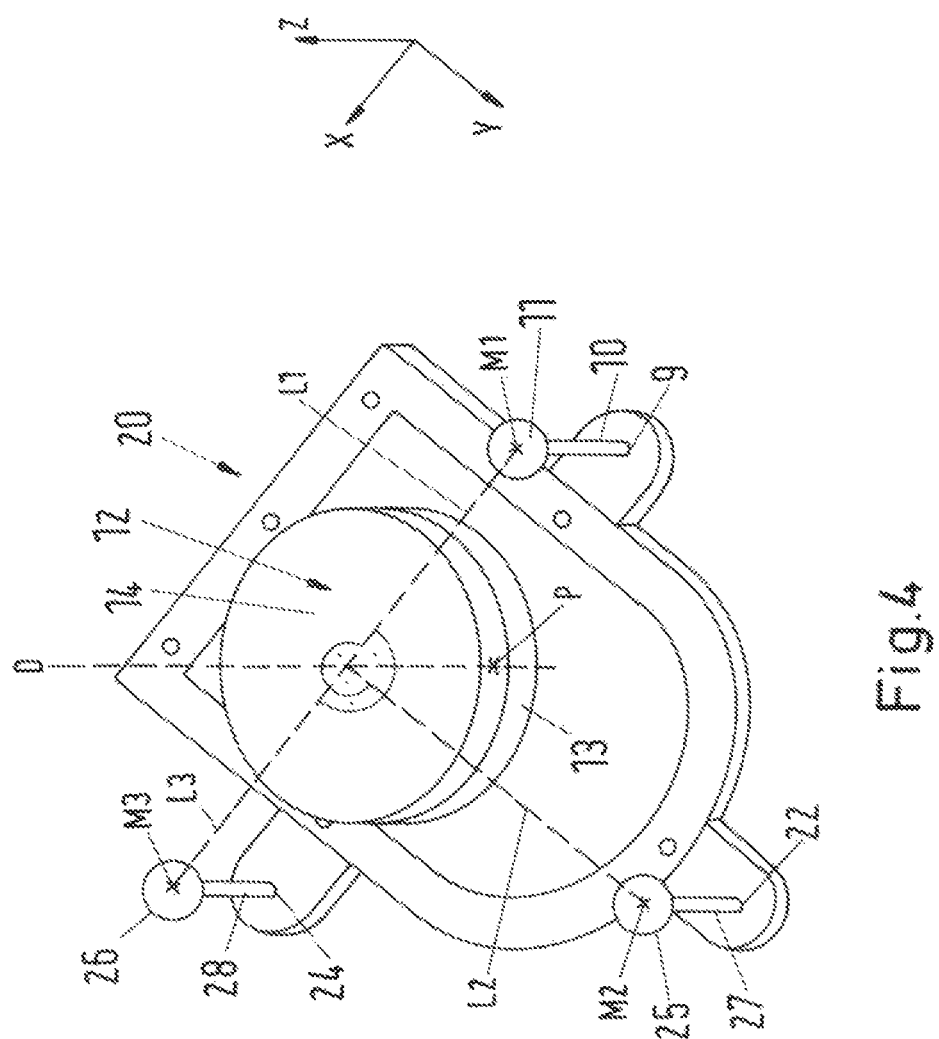
FIG. 4 shows an arrangement of the adapter element from FIG. 3, a rotary apparatus and three additional devices.
Figure 5:
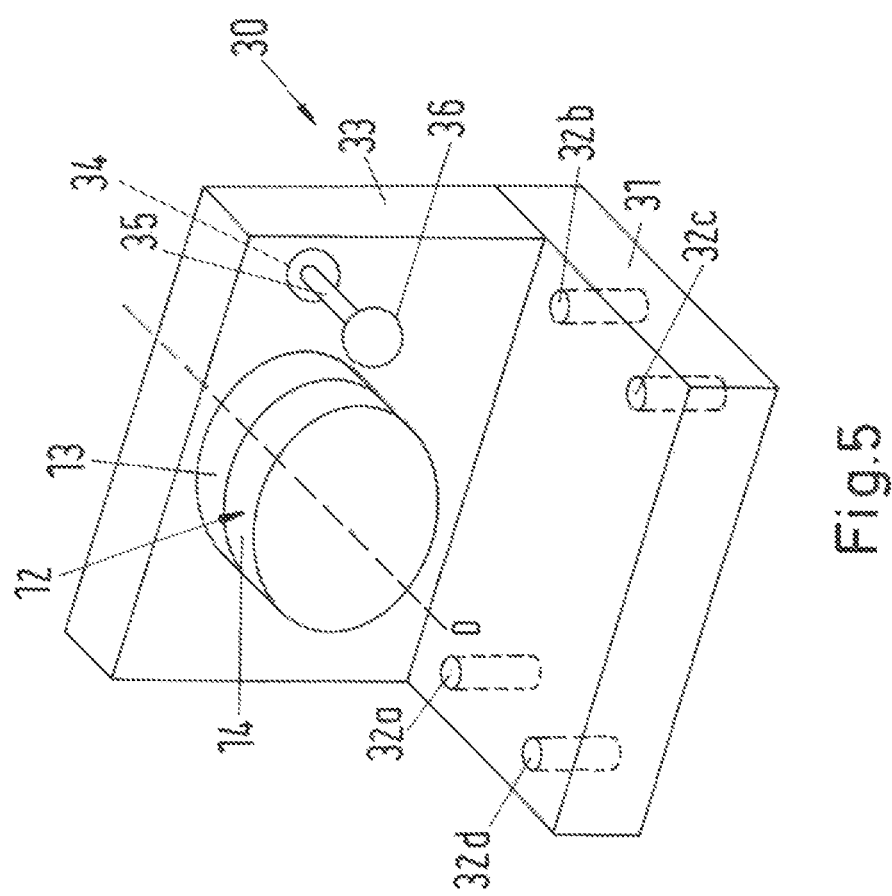
FIG. 5 shows a third embodiment of an adapter element with, arranged thereon, a rotary apparatus and an additional device, as a result of which a further embodiment of an arrangement is formed.

A fastening region 7 that is outlined by dashes, where a rotary apparatus can be arranged, is indicated approximately in the center of the adapter element 1. Further, provision is made of the fastening means 8a, 8b, 8c in the form of holes, which serve to fasten a rotary apparatus. By way of example, the holes 8a-8c are through holes. Screws for fastening a rotary table can be guided through the through holes. A counter element, for example a nut, can be provided on the lower side of the adapter plate 1. By way of example, a rotary apparatus can be fastened as also shown in FIGS. 3, 4 and 5 in WO 2013/156074. Alternatively, the holes 8a-8c can be provided with female threads such that a fastening screw can be screwed into a hole in each case.

A blind hole into which a shaft 10 of a probe body 11 (see FIG. 2), which is a measuring body that can be captured in a tactile manner, can be introduced is formed in the lateral protrusion 3 as a coupling means 9. Such a shaft has been matched to the blind hole 9 with such exact fit that it can be arranged without movement or largely without movement in the hole 9. Alternatively, the blind hole can have a female thread and the shaft can have a male thread. As an alternative to a hole as a coupling means 9, a three-point bearing can be provided on the protrusion 3, said three-point bearing having been explained in the general part of the description.

Figure 2:
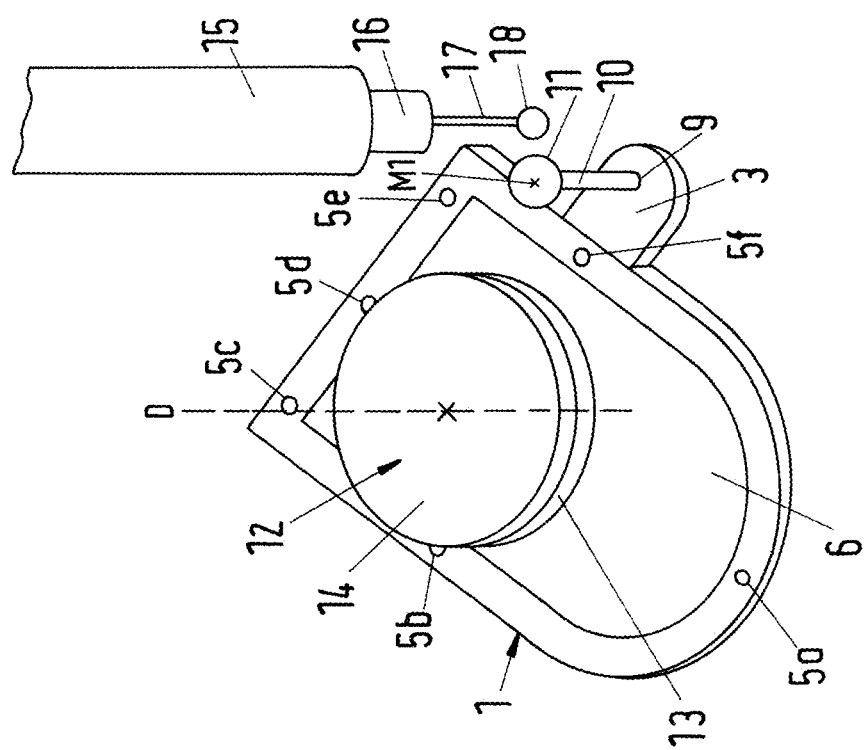
FIG. 2 shows an arrangement of the adapter element from FIG. 1, a rotary apparatus and an additional device.

FIG. 2 shows an arrangement of the adapter element 1 from FIG. 1, the rotary apparatus 12 and the probe body 11 as an additional device. The rotary apparatus 12 is a rotary table with the stator 13 and the rotor or rotary plate 14. The stator 13 is fastened to the adapter element 1 in the fastening region 7. In FIG. 2, the fastening means 8a, 8b, 8c shown in FIG. 1 are covered by the stator 13.

The rotor 14 is rotatable about the virtual axis of rotation D.

The probe body 11 is spherical and connected to the shaft 10 that has been inserted into the hole 9 of the adapter element 1. The sphere 11 can be probed by the measurement system of a coordinate measuring machine. The measurement system of a CMM has the quill 15, the probe head 16, the stylus 17 and the ball tip 18.

The probe body reference point M1 is the center of the sphere 11. The probe body reference point M1, or the coordinates thereof, can be determined by probing the sphere 11 with the ball tip 18 of the coordinate measuring machine. By way of example, the sphere 11 can be scanned by the ball tip 18. By way of example, the positional situation of the rotary table axis D can be ascertained once on the basis of test bodies, for example according to a method as described in WO 2013/164344 A1 and WO 02090879 A2. From the positional situation of the axis of rotation D and the coordinates of the probe body reference point M1, it is possible to establish a relative relationship between D and M1, in particular, it is possible to ascertain the shortest distance between D and M1. By subsequent repeated probing of the sphere 11 and renewed determination of the point M1, it is possible to monitor the positional situation of the axis of rotation D relative to the point M1, in particular the distance therebetween. As a result of the relative positional situation of D and M1 being kept constant by the formation of the adapter element 1, the positional situation of the axis of rotation D can be ascertained at any instant by way of determining the coordinates of M1. By way of example, an origin of the machine coordinate system can be placed onto the point M1 and the positional situation of the axis of rotation D in the machine coordinate system can be determined with the aid of test bodies by using a method from WO 02090879. At subsequent instants, the positional situation of M1, and hence the positional situation of an origin of the machine coordinate system, can be determined anew. As a result of the fixed relationship between M1 and D in terms of a spatial relation, the positional situation of D also is known in the machine coordinate system at the subsequent instants in certain, but not necessarily all, degrees of freedom.

FIG. 3 shows a modified embodiment of an adapter element 20 compared to the adapter element from FIG. 1. The same reference signs as in FIG. 1 indicate same features that were already explained in FIG. 1. In comparison with the embodiment of FIG. 1, the adapter plate 20 has further coupling means for coupling an additional device. Provision is made of a further protrusion 21 with the coupling means 22, which is configured analogously to the coupling means 9, and a third protrusion 23 with the coupling means 24, which likewise has an analogous configuration to the coupling means 9. Probe bodies with a shaft, which can be configured analogously to a probe body 11 with the shaft 10 in FIG. 2, can be coupled to the adapter plate 20 by means of the coupling means 22, 24, and so it is possible to couple up to three probe bodies, as shown in FIG. 4.

The relative positional situation of the coupling means 9, 22, 24 in FIG. 3 is illustrated by way of dashed lines. The point P denotes the location at which an axis of rotation D of a rotary apparatus 12 that is fastened to the adapter plate 20 pierces the adapter plate, as shown in FIG. 2. In relation to the point P, the coupling means 9, 22, 24 are arranged at right angles to one another, as shown by the dashed lines. From this, a position of probe body reference points, shown below in FIG. 4, emerges.

The arrangement shown in FIG. 4 shows the adapter plate 20 from FIG. 2 with a rotary apparatus 12 fastened thereto and with three probe bodies 11, 25, 26, which are coupled by the coupling means 9, 22, 24 from FIG. 3, which are embodied as spheres and which have shafts 10, 27, 28 that are inserted into the cutouts 9, 22, 24. By way of example, provision can be made of screwed connections or magnetic connections.

The probe body 11 has the probe body reference point M1. The probe body 25 has the probe body reference point M2 which, like in the probe body 11, is a center of a sphere. Likewise, the probe body 26 has the probe body reference point M3 which, in turn, is a center of a sphere.

A first virtual line L1, plotted by dashes, extends from the axis of rotation D of the rotary table 12 to the probe body reference point M1 and it is perpendicular to the axis of rotation D. In the same way, the line L2 extends from the reference point M2 of the second probe body 25 to the axis of rotation D and it is perpendicular to the axis of rotation D. The lines L1 and L2 once again include an angle of 90°. Extending from the third probe body reference point M3 to the axis of rotation D is the virtual line L3 and it is perpendicular to the axis of rotation D and perpendicular to the line L2. By way of example, the probe body reference point M2 can be positioned in a relatively stationary manner in relation to an X-coordinate of the rotary table axis D and the probe body reference point M1 can be positioned in a stationary manner relative to the Y-coordinate of the rotary table axis D. The X-coordinate and the Y-coordinate of the rotary table axis D can be ascertained in the machine coordinate system by calibrating the rotary table axis, as described, for example, in WO 02090879 A2 and WO 2013/164344 A1. There, the positional situation of the rotary table axis is disclosed with the aid of a test body positioned on the rotary plate 14. At subsequent instants, the X-coordinate and the Y-coordinate of the rotary table axis can be ascertained from the X-coordinate of the reference point M2 and from the Y-coordinate of the reference point M1 without the need for a renewed calibration of the axis of rotation D with a test body 14 situated on the rotary plate. Such a method is described in detail in WO 2013/164344 A1 and the arrangement shown here can be used advantageously for such a method.

By determining the coordinates of all three probe body reference points M1, M2 and M3, it is possible to ascertain a reference plane in the Cartesian coordinate system, for example of the coordinate measuring machine. The positional situation of the axis of rotation D is preferably perpendicular to this reference plane and assumed to be constant in relation to this reference plane. By determining the positional situation of the reference plane again at one or more subsequent instants, it is possible to ascertain a change in the positional situation of the plane and hence possible to ascertain a change in the positional situation of the axis of rotation D (tilt) in the coordinate system.

FIG. 5 shows an adapter element 30 with an angular configuration. The adapter element 30 has the limb 31, on which provision is made of fastening means 32a, 32b, 32c and 32d in the form of through holes. The limb 31 can be fastened to a measurement table 201 of a coordinate measuring machine with the aid of these fastening means 32.

The rotary apparatus 12, which has an analogous configuration to the rotary apparatus shown in the previous images, is fastened to the limb 33 that is perpendicular to the limb 31. The coupling means 34, which has an analogous configuration to the coupling means 9, 22 and 24 in FIGS. 1 to 3, is provided next to the rotary apparatus 12. The spherical probe body 36 is coupled by way of the shaft 35, in a manner analogous to the way in FIGS. 2 and 4.

Using the arrangement shown in FIG. 5 and the adapter element 30, it is possible to introduce a rotary apparatus into the measurement space of a coordinate measuring machine in such a way that the axis of rotation D lies in the XY-plane of a machine coordinate system.

Figure 6:
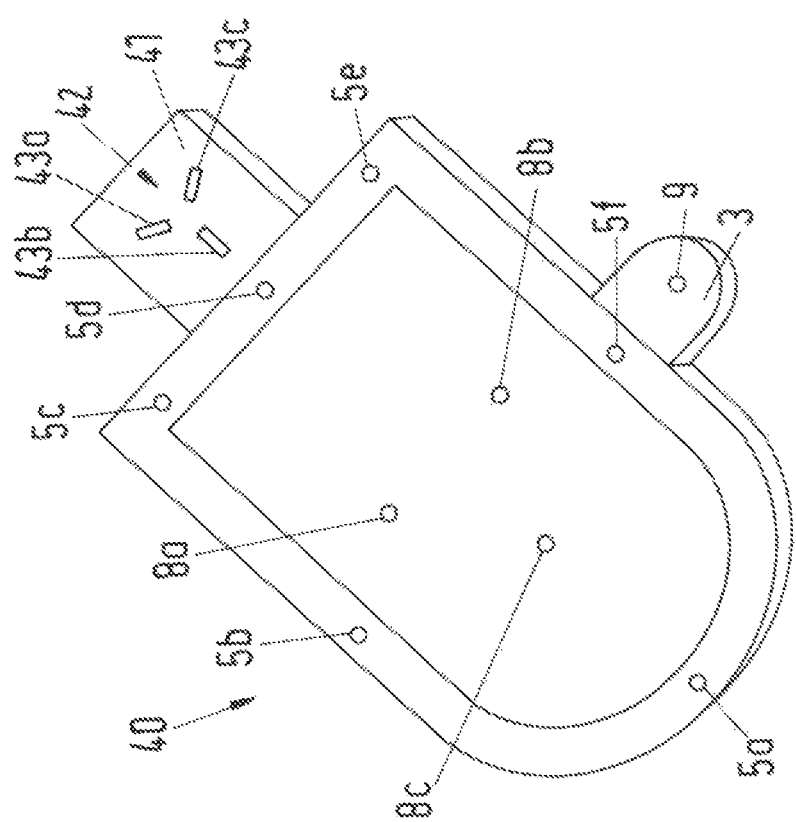
FIG. 6 shows a fourth embodiment of an adapter element.

FIG. 6 shows a development of the adapter element 1 from FIG. 1, wherein identical reference signs have the same meaning as in FIG. 1. Provided in a further protrusion 41 there is a further coupling means 42, on which an accessory apparatus can be coupled, as will still be shown in FIG. 7 below. The coupling means 42 is configured in the form of three depressions 43a-43c, which are formed in the protrusion 41. In order to establish a connection to an accessory apparatus, the arrangement of depressions 43a-43c can interact with an arrangement of elevations that are complementary in terms of form and relative arrangement to one another and that form a further coupling means. The aforementioned three elevations are provided accordingly on the accessory apparatus.

Figure 7:
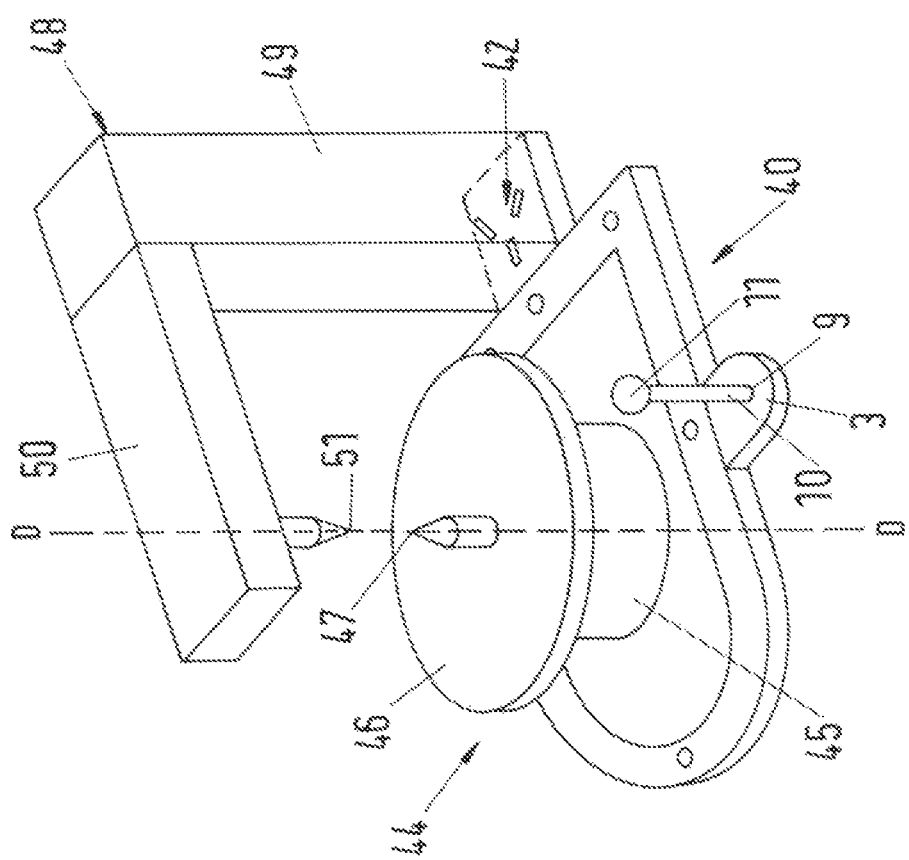
FIG. 7 shows an arrangement having the adapter element from FIG. 5 and also a rotary apparatus and two additional devices.

FIG. 7 shows the adapter element 40 with a rotary apparatus 44 that is fastened to the adapter plate 40. The rotary apparatus 44 has the stator 45 and the rotary plate 46. A tip 47 for holding a workpiece is fastened to the rotary plate 46. Hence, this is a stationary tip on the rotary plate 46 that is centered on the axis of rotation D (said tip being stationary relative to the rotary plate 46 but rotatable about the axis D).

Furthermore, a previously explained probe body 11 has been attached to the adapter plate 40.

Furthermore, a counterholder 48 is coupled by way of the coupling means 42. The column 49 of the counterholder has been illustrated transparently such that the coupling means 42 is visible in FIG. 7. Provided at the lower end of the column 49 is a coupling means which is complementary to the coupling means 42, which was explained previously and which is not shown here.

Furthermore, the counterholder 48 has the crossbeam or boom 50, the rotatable tip 51, which points downward, being attached to the end thereof. A workpiece can be clamped between the tip 47 on the rotary plate 46 and the tip 51. The boom is displaceable in the direction of the axis of rotation D, and so the distance between the tip 47 and the tip 51 is changeable. The displacement mechanism has not been shown in any more detail.

It is necessary for both tips 47 and 51 to lie on the axis of rotation D or be collinear with the axis of rotation D. This is achieved by exact positioning on the rotary plate 46 in the case of the tip 47. The adapter element 40 according to the invention with the coupling means 42 aids in the exact positioning of the tip 51 on the axis of rotation D. By way of example, the rotary table 44 is immovably fastened to the adapter plate 40. Subsequently, the counterholder 48 can be coupled by way of the coupling means 42 (and a complementary coupling means, not shown here, on the counterholder itself). Thereupon, the counterholder tip 51 can be positioned precisely on the axis of rotation D of the rotary table 44. By way of example, the tip 51 on the counterholder 48 is adjustable in terms of its position and/or orientation relative to the counterholder column 49, which may be effectuated in various ways which are not explained here in any more detail. Reproducible coupling of the counterholder 48 on the adapter plate 40 is obtained by way of the coupling means 42. Thus, the counterholder 48 can be removed and coupled on at any subsequent instant in a reproducible manner, with the positional situation of the tip 51 on the axis of rotation being exactly reestablished. Hence, a decision as to whether or not a counterholder should be present as an accessory apparatus can be made during the measurement operation of the rotary table 44. If the counterholder is not required, it can be removed since it may represent a relatively large interference contour and may interfere with the measurement operation. The counterholder 48 can be coupled back on at a later instant.

Figure 8:
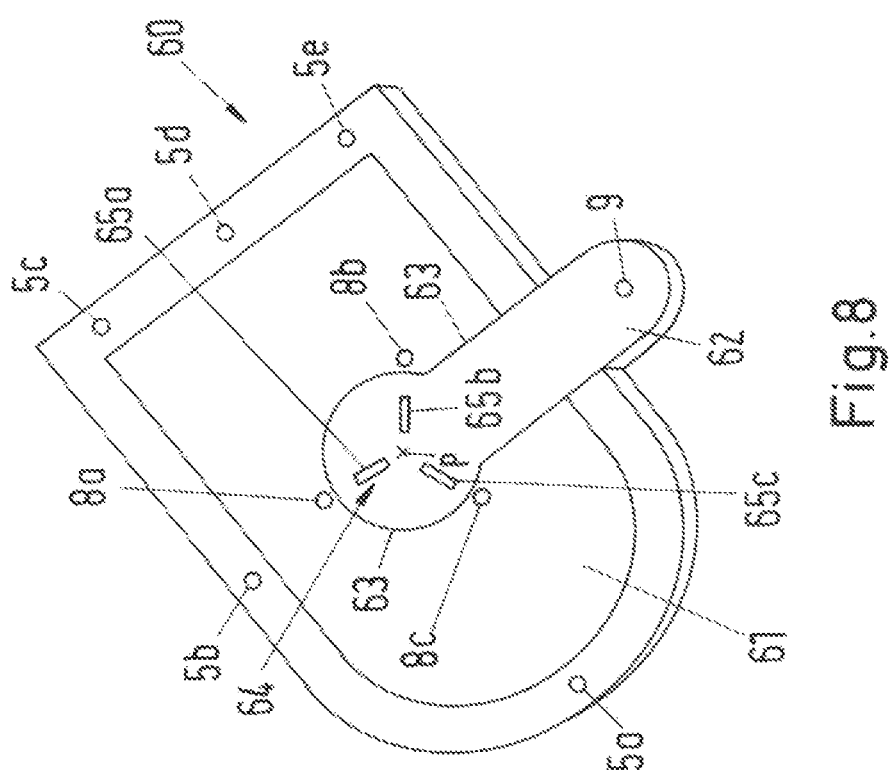
FIG. 8 shows a fifth embodiment of an adapter element.

FIG. 8 shows a two-part adapter plate 60, the form of which is similar to that of the adapter plate from FIG. 1. The first part 61 has the fastening means 5*a*-5*e* for fastening the plate 60 onto a measurement table 201 of a coordinate measuring machine 211 (see FIG. 9). The second part 62 is inserted with precise fit into a cutout 63 in the first part 61. The second part 62 can be separable from the first part or can be permanently connected to the first part. Connection means can be provided between the two parts 61, 62. The connection is embodied with fit. The part 61 may expand without allowing stresses to arise. Ideally, 62 is fastened at a single point, e.g. at the center of the rotary table.

The second part 62 is manufactured from a temperature-invariant material and has a smaller coefficient of expansion than the material of the first part 61. By way of example, the part 62 is manufactured from an iron-nickel alloy with 64% iron and 36% nickel.

The coupling means 9, which already has been described on the basis of the preceding figures, is provided in or on the second part 62. Further, fastening means 8*a*, 8*b*, 8*c* are provided on the part 61, said fastening means serving to fasten a rotary table and already having been described on the basis of the preceding figures. In contrast to the embodiments described above, the adapter plate 60 also has a coupling means 64 for coupling a rotary apparatus on the second part 62 that is made of temperature-invariant material. The coupling means 64 has an analogous configuration to a coupling means 42 in FIG. 6 and has the depressions 65*a*, 65*b* and 65*c*. Elevations that are designed and arranged relative to one another in a complementary manner can engage into these depressions, said elevations being provided on the lower side of a rotary apparatus. As a result, a rotary apparatus can be arranged on the adapter plate 60, also in a reproducible position and/or orientation when this coupling means is embodied.

The second part 62, which forms a region of the adapter element 60, extends from the location at which the coupling means 9 is embodied to the location at which the axis of rotation D of a rotary apparatus fastened to the adapter plate 60 impinges on the adapter element. This location is denoted by the point P. FIG. 4 shows that an axis of rotation D intersects the adapter plate 20 at the point P. Further, as already explained, provision is made of fastening means 8*a*-8*c* and coupling means 64 for a rotary apparatus in the temperature-invariant region 62.

Figure 9:
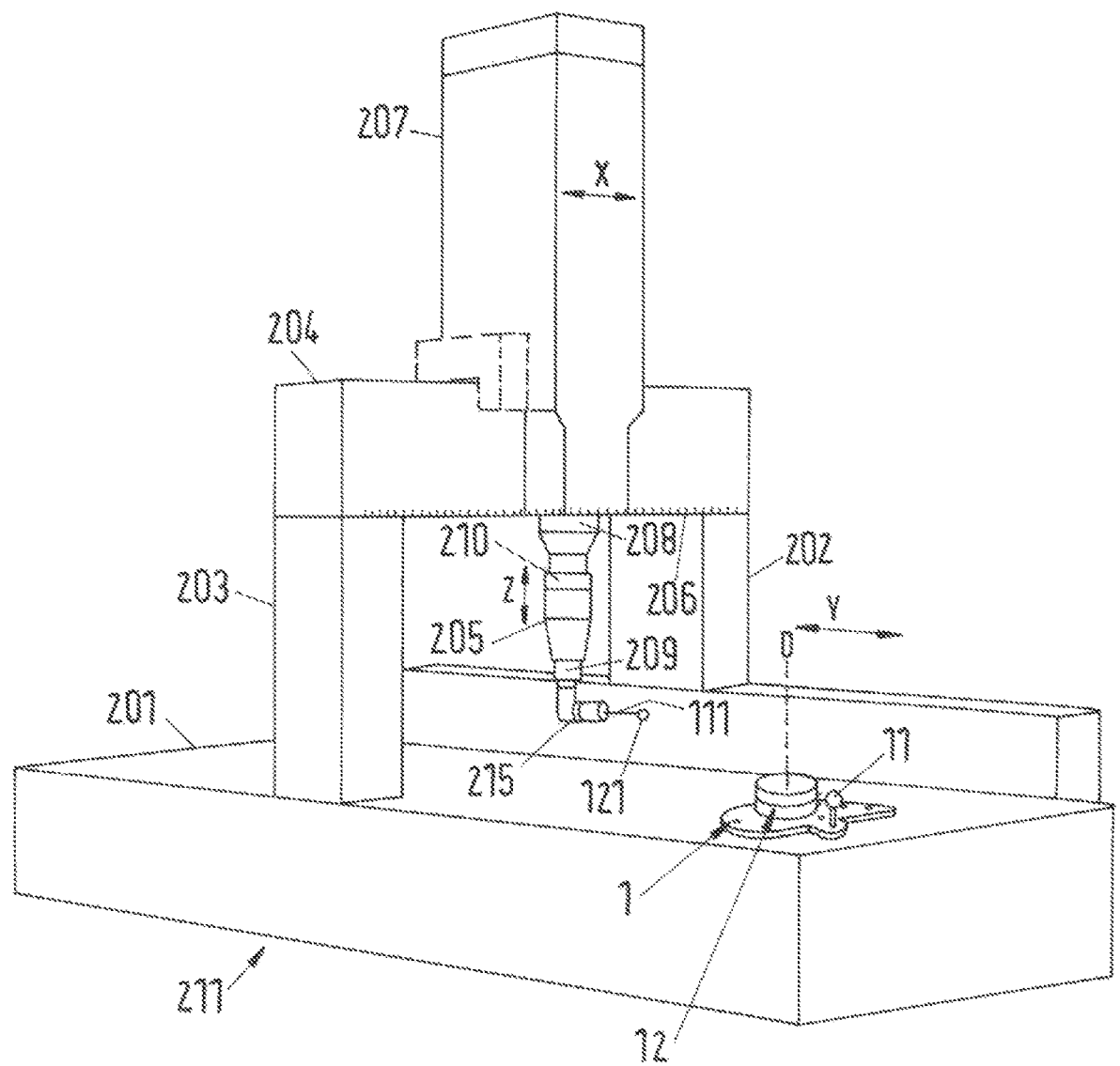
FIG. 9 shows a coordinate measuring machine according to the invention.

The coordinate measuring machine (CMM) 211 with a portal design, depicted in FIG. 9, comprises a measurement table 201, above which columns 202, 203 are arranged in a manner movable in the Y-direction of a Cartesian coordinate system. Together with a crossbeam 204, the columns 202, 203 form a portal of the CMM 211. At its opposite ends, the crossbeam 204 is connected to the columns 202 and 203, respectively. Electric motors, which are not depicted in more detail, cause the linear movement of the columns 202, 203 in the Y-direction, along the Y movement axis. Here, for example, one electric motor is associated with each one of the two columns 202, 203. The crossbeam 204 is combined with a cross slide 207, which is movable, by way of air bearings, along the crossbeam 204 in the X-direction of the Cartesian coordinate system. The current position of the cross slide 207 relative to the crossbeam 204 can be determined on the basis of a scale graduation 206. The movement of the crossbeam 204 in the X-direction, i.e. along the X movement axis, is driven by a further electric motor. A quill 208, which is movable in the vertical direction, is mounted on the cross slide 207 and connected at the lower end thereof to a coordinate measuring apparatus 209 by way of a mounting device 210 and a rotary apparatus 205. The coordinate measuring apparatus 209 comprises an angled probe head 215, on which a stylus 111 with a ball tip 121 is arranged in a removable manner. The coordinate measuring apparatus 209 can be moved relative to the cross slide 207 in the Z-direction, along the Z movement axis, of the Cartesian coordinate system, by way of being driven by a further electric motor. The probe head 209 can be brought into virtually any positions in the region below the crossbeam 204 by way of the electric motors of the CMM. Furthermore, the rotary apparatus 205 can rotate the probe head 215 about the Z-axis such that the stylus 111 can be aligned in different directions. Not illustrated is a controller which controls the movement of the movable parts of the CMM along the movement axes. The controller is configured for performing one or more of the steps explained in the general part of the description.

Fastened to the measurement table 201 of the coordinate measuring machine 211 is the adapter plate 1 shown in FIG. 1. A probe sphere 11, which was explained in FIG. 2, is coupled thereon. Fastened to the adapter plate 1 is the rotary table 12 such that, overall, the arrangement formed in FIG. 2 is established. It is self-evident that any adapter element can be attached to any arrangement, which was already explained above in an exemplary manner and in the general part of the description, on the coordinate measuring machine 211 or the measurement table 201 thereof.

Figure 10:
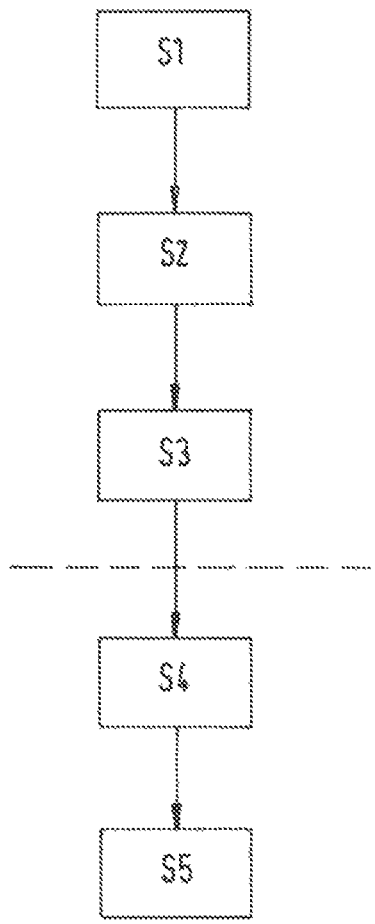
FIG. 10 shows a method sequence of the method according to the invention.

FIG. 10 schematically illustrates a method sequence according to the invention. The method steps mentioned below were also already explained, in part, in the preceding description. Initially, a coordinate of a probe body reference point M1 is ascertained in step S1 using the measurement system of the coordinate measuring machine 211. This can be explained on the basis of FIG. 9: the ball tip 121 is used to probe the sphere 11 and the sphere center M1 (see FIG. 2) is determined as a reference point. Consequently, the coordinates X, Y and Z of the point M1 are ascertainable by probing the sphere 11.

In a further step S2, at least one coordinate of the axis of rotation D is determined, e.g. the X- and Y-coordinates of the axis of rotation D at a Z-level of the probe body reference point M1, i.e. of the center of the sphere 11. As a result of the coordinates of the reference point M1 and of the axis of rotation D being known level with the reference point M1, the distance (shortest distance) of the point M1 from the axis of rotation D is also known. In order to determine the aforementioned coordinates of the axis of rotation D, use can be made of a method which is known per se from WO 2013/164344 A1 and WO 02090879 A2. Here, a test body is positioned on the rotary plate of the rotary table for determining the positional situation of the axis of rotation and said test body is measured in various rotational positions. In respect of details, reference is made to the cited documents.

The steps S1 and S2 can be carried out in any sequence.

Step S1 is repeated in step S3, i.e. the positional situation of the reference point M1 is determined anew by probing the sphere 11. Since the relative position of the reference point M1 to the axis of rotation D, in this case the distance between the two, is known, the positional situation of the axis of rotation D is also simultaneously determinable at a later instant by probing the sphere 11 and ascertaining the positional situation of the reference point M1, said positional situation of the axis of rotation here being the X-position and Y-position level with the reference point M1. Thus, at later instants, it is no longer necessary to calibrate an axis of rotation again with a separate test body, as explained above on the basis of step S2 with reference to the cited documents.

The method can be extended in such a way that a further probe body reference point M2 is determined in step S4 on the basis of a further probe body 25, which is shown in FIG. 4. Since the position of the reference point M2 is known, the relative position or, in this case, the shortest distance between M2 and the axis of rotation D, which was calibrated in step S2, is also known. This provides additional information for determining the positional situation of the axis of rotation D. At a later instant, the reference point M2 can be determined anew in step S5 by probing the sphere 25 and information about the positional situation of the axis of rotation D is obtained therefrom. In particular, as explained above, an adapter plate 20 with probe bodies 11 and 25 from FIG. 4 is positioned in such a way that the point M1 is positioned on the X-coordinate of the axis of rotation D and the point M2 is positioned on the Y-coordinate of the axis of rotation D. As a result, the X-coordinate and the Y-coordinate of the axis of rotation D can be directly ascertained at any subsequent instant in steps S3 and S5, as described in WO 2013/164344 A1.

The invention claimed is:

1. An arrangement comprising:
   a rotary apparatus having an axis of rotation (D);
   a device; and
   an adapter element configured to assemble the rotary apparatus in a measurement space of a coordinate measuring machine, wherein:
   the adapter element includes:
      a first fastening portion configured to fasten the adapter element in the measurement space,
      a second fastening portion, and
      a coupling portion,
   the rotary apparatus is fastened to the adapter element at the second fastening portion,
   the device is coupled to the adapter element at the coupling portion,
   the coupling portion is arranged adjacently to the second fastening portion, and
   the device is positioned on the adapter element next to the rotary apparatus.

2. The arrangement of claim 1, wherein the device is selected from a measuring body, a sensor holder, an accessory apparatus for the rotary apparatus, or any combination thereof.

3. The arrangement of claim 2, wherein:
   the device includes the accessory apparatus, and
   the accessory apparatus is an apparatus for holding a workpiece.

4. The arrangement of claim 1, wherein the coupling portion includes:
   a first coupling portion configured to couple a first measuring body, and
   a second coupling portion configured to couple a second measuring body.

5. The arrangement of claim 4, wherein the coupling portion further includes a third coupling portion configured to couple a third measuring body.

6. The arrangement of claim 5, wherein the coupling portion further includes a fourth coupling portion configured to couple an accessory apparatus for the rotary apparatus.

7. The arrangement of claim 1, wherein the adapter element includes a temperature-invariant material.

8. The arrangement of claim 1, wherein:
   the adapter element further includes a second coupling portion; and
   the second coupling portion is configured to cooperate with the second fastening portion to couple the rotary apparatus to the adapter element in a reproducible position, a reproducible orientation, or both a reproducible position and a reproducible orientation.

9. The arrangement of claim 1, wherein:
   the device includes:
      a first measuring body; and
      a second measuring body,
   a first virtual line (L1) extends from the axis of rotation (D) of the rotary apparatus that is fastened to the adapter element to a measuring body reference point (M1) of the first measuring body,
   the first virtual line (L1) is perpendicular to the axis of rotation (D),
   a second virtual line (L2) extends from the axis of rotation (D) to a measuring body reference point (M2) of the second measuring body,
   the second virtual line (L2) is perpendicular to the axis of rotation (D), and
   the first virtual line (L1) and the second virtual line (L2) define an angle of substantially 90°.

10. The arrangement of claim 1, wherein the rotary apparatus is one of (i) a single axis rotary table, (ii) a two axis rotary table, (iii) an n axis rotary table, where n is an integer, (iv) a rotary joint with an axis of rotation, or (v) a rotary swivel joint with two or more axes of rotation.

11. A coordinate measuring machine comprising the arrangement of claim 1.

12. The arrangement of claim 1, wherein the first fastening portion defines (i) a hole in the adapter element, (ii) a thinned region having a first thickness that is less than a second thickness of another region of the adapter element, or (iii) both the hole and the thinned region.

13. The arrangement of claim 1, wherein the second fastening portion defines (i) a hole in the adapter element, (ii) a thinned region having a first thickness that is less than a second thickness of another region of the adapter element, or (iii) both the hole and the thinned region.

14. The arrangement of claim 1, further comprising a fastener configured to engage the first fastening portion or the second fastening portion.

15. The arrangement of claim 14, wherein the fastener includes a screw, a clamp, or both the screw and the clamp.

16. The arrangement of claim 1, wherein the device is coupled to the coupling portion of the adapter element by (i) a screw, (ii) a projection on one of the device or the adapter element and a depression on the other of the device or the adapter element, (iii) a three-point bearing, or (iv) any combination thereof.

17. A method for determining a positional situation of an axis of rotation (D) of a rotary apparatus in a machine coordinate system of a coordinate measuring machine, wherein:

an arrangement includes the rotary apparatus, a device, and an adapter element fastened in a measurement space of the coordinate measuring machine, and the device includes a first measuring body that has a first measuring body reference point (M1), and the first measuring body reference point (M1) is positioned in a stationary manner relative to the axis of rotation (D) of the rotary apparatus, the method comprising:

a) ascertaining at least one coordinate of the first measuring body reference point (M1) using a measurement system of the coordinate measuring machine;

b) ascertaining at least one coordinate of the axis of rotation (D); and c) repeating step a) at a subsequent instant and ascertaining the at least one coordinate of the axis of rotation (D) at the subsequent instant from the at least one coordinate of the first measuring body reference point (M1).

18. The method of claim 17, wherein the first measuring body reference point (M1) is positioned on an X-coordinate or near the X-coordinate of the axis of rotation (D).

19. The method of claim 17, wherein:

the arrangement includes a second measuring body that includes a second measuring body reference point (M2), the second measuring body reference point (M2) is positioned in a stationary manner relative to the axis of rotation (D) of the rotary apparatus, the second measuring body is coupled to the adapter element, and the method further comprises:

d) ascertaining at least one coordinate of the second measuring body reference point (M2) using a measurement system of the coordinate measuring machine; and e) repeating step d) at a subsequent instant and ascertaining at least one further coordinate of the axis of rotation (D) at the subsequent instant from the at least one coordinate of the second measuring body reference point (M2).

20. The method as claimed in claim 19, wherein the second measuring body reference point (M2) is positioned on a Y-coordinate or near the Y-coordinate of the axis of rotation (D).

* * * * *